US012054352B2

(12) United States Patent
Uchida et al.

(10) Patent No.: US 12,054,352 B2
(45) Date of Patent: Aug. 6, 2024

(54) GEAR, SHEET CONVEYANCE DEVICE, AND IMAGE FORMING APPARATUS

(71) Applicant: CANON KABUSHIKI KAISHA, Tokyo (JP)

(72) Inventors: Yuki Uchida, Chiba (JP); Yuki Akamatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 17/398,543

(22) Filed: Aug. 10, 2021

(65) Prior Publication Data

US 2022/0063941 A1 Mar. 3, 2022

(30) Foreign Application Priority Data

Aug. 27, 2020 (JP) ................................ 2020-143827

(51) Int. Cl.

*B65H 5/06* (2006.01)
*B65H 29/12* (2006.01)
*B65H 29/14* (2006.01)
*G03G 15/00* (2006.01)
*G03G 15/16* (2006.01)

(52) U.S. Cl.

CPC ............. *B65H 5/06* (2013.01); *B65H 29/125* (2013.01); *B65H 29/14* (2013.01); *G03G 15/1615* (2013.01); *G03G 15/6529* (2013.01); *B65H 2402/60* (2013.01); *B65H 2403/42* (2013.01); *B65H 2404/16* (2013.01); *B65H 2801/06* (2013.01); *G03G 2215/00679* (2013.01); *G03G 2221/1657* (2013.01)

(58) Field of Classification Search

CPC .. B65H 2403/40; B65H 2402/60; B65H 5/06; F16D 1/0805; F16D 1/0852; F16D 1/0858; G03G 2221/1657; G03G 15/1615; G03G 21/1647; G03G 15/757; F16H 57/0025

See application file for complete search history.

(56) References Cited

U.S. PATENT DOCUMENTS 5,845,175 A * 12/1998 Kumar .................. F16D 1/0858 403/375

FOREIGN PATENT DOCUMENTS

JP H0519716 U 3/1993
JP H1037969 A 2/1998
JP H11338213 A 12/1999
JP 2018184973 A 11/2018

(Continued)

*Primary Examiner* — Jeremy R Severson

(74) *Attorney, Agent, or Firm* — Canon U.S.A., Inc. IP Division

(57) ABSTRACT

A sheet conveyance device includes a rotary shaft, a conveyance roller, a driving source, and a gear. The gear rotates integrally with the rotary shaft and transmits a driving force from the driving source to the conveyance roller. The gear includes a tooth portion engaging with another gear, a wall surface forming a hole into which the rotary shaft is inserted, a deformable portion, and a pressing part. The deformable portion has a cantilever shape at least partially provided in an area provided with the tooth portion in a gear rotation axis direction. The pressing part protrudes from the wall surface toward the rotation center of the gear, and is elastically deformed by being pressed by the rotary shaft. The pressing part presses the rotary shaft toward the wall surface on a side opposite to the deformable portion in a state where the gear is attached to the rotary shaft.

16 Claims, 18 Drawing Sheets

(56) References Cited

FOREIGN PATENT DOCUMENTS

| | | | |
|---|---|---|---|
| JP | 2019139118 | A | 8/2019 |
| JP | 2020-093886 | A | 6/2020 |

* cited by examiner

GEAR, SHEET CONVEYANCE DEVICE, AND IMAGE FORMING APPARATUS

BACKGROUND

Field

The present disclosure relates to a gear for transmitting a driving force, a sheet conveyance device including the gear, and an image forming apparatus.

Description of the Related Art

An image forming apparatus and an image reading apparatus each including a sheet conveyance device that conveys a sheet have been known. The sheet conveyance device of this type transmits a driving force from a driving source to a rotary shaft of a conveyance roller using a gear attached to the rotary shaft.

In such a sheet conveyance device, a configuration in which the rotary shaft is inserted into an insertion hole of the gear and the gear is attached to the rotary shaft by snap-fit has been known. The gear having such a configuration includes a cantilever-shaped deformable portion in the insertion hole into which the rotary shaft is inserted, and an engaging portion, which prevents the gear from being detached from the rotary shaft, is provided in the deformable portion. When the rotary shaft is inserted into the insertion hole of the gear, the deformable portion is pressed by the rotary shaft and is elastically deformed, and then, the engaging portion engages with an engaged portion provided in the rotary shaft. As a result, the gear is attached to the rotary shaft.

In a gear discussed in Japanese Patent Application Laid-Open No. 2020-93886, a cantilever-shaped deformable portion is provided in an area where a tooth portion of the gear is provided in a rotation axis direction. As described above, the deformable portion is provided inside the tooth portion of the gear, which makes it possible to downsize the gear and a rotary shaft as compared with a configuration in which the rotary shaft and the insertion hole are extended and the gear is screwed to the rotary shaft.

The gear attached to the rotary shaft retains an attitude to the rotary shaft by a wall surface forming the insertion hole into which the rotary shaft is inserted. In a case where a retaining force, which retains the attitude of the gear to the rotary shaft, is weak, the gear may be inclined to the rotary shaft, and a rotation center of the gear and an axial center of the rotary shaft may be misaligned. In such a case, eccentricity occurs when the gear rotates, which may cause conveyance failure and noise. To prevent the eccentricity, it is desirable to retain the attitude of the gear to the rotary shaft and to fix the gear so as not to be inclined to the rotary shaft.

In the gear including the deformable portion inside the tooth portion, however, the retaining force, which retains the attitude of the gear to the rotary shaft, is weak, because the cantilever-shaped deformable portion is easily elastically deformed. Accordingly, the gear may bend the deformable portion and be inclined, and thus the rotation center of the gear and the axial center of the rotary shaft may be misaligned, which results in eccentricity when the gear rotates.

SUMMARY

The present disclosure is directed to reduction of occurrence of eccentricity when a gear rotates, in a configuration in which a deformable portion is provided inside a tooth portion of the gear.

According to an aspect of the present disclosure, a sheet conveyance device includes a rotary shaft configured to include an engaged portion having a concave-shape, a conveyance roller configured to rotate around the rotary shaft and to convey a sheet, a driving source configured to drive the conveyance roller, and a gear configured to rotate integrally with the rotary shaft and to transmit a driving force from the driving source to the conveyance roller, wherein the gear includes: a tooth portion configured to engage with another gear, a wall surface configured to form an insertion hole into which the rotary shaft is inserted, a deformable portion configured to have a cantilever shape at least partially provided in an area provided with the tooth portion in a rotation axis direction of the gear, configured to form the insertion hole together with the wall surface, and configured to be elastically deformed by being pressed by the rotary shaft when the rotary shaft is inserted into the insertion hole, an engaging part configured to protrude from the deformable portion toward a rotation center of the gear, to engage with the engaged portion of the rotary shaft when the rotary shaft is inserted while elastically deforming the deformable portion, and to prevent the rotary shaft from falling off from the insertion hole, and a pressing part configured to protrude from the wall surface toward the rotation center of the gear, configured to be elastically deformed by being pressed by the rotary shaft when the rotary shaft is inserted into the insertion hole, and configured to press the rotary shaft toward the wall surface on a side opposite to the deformable portion in a state where the gear is attached to the rotary shaft.

Further features of the present disclosure will become apparent from the following description of exemplary embodiments with reference to the attached drawings.

DESCRIPTION OF THE EMBODIMENTS

Some exemplary embodiments of the present disclosure are described below with reference to the accompanying drawings. The following exemplary embodiments are examples embodying the present disclosure, and do not intend to limit the technical scope of the present disclosure.

Figure 1:
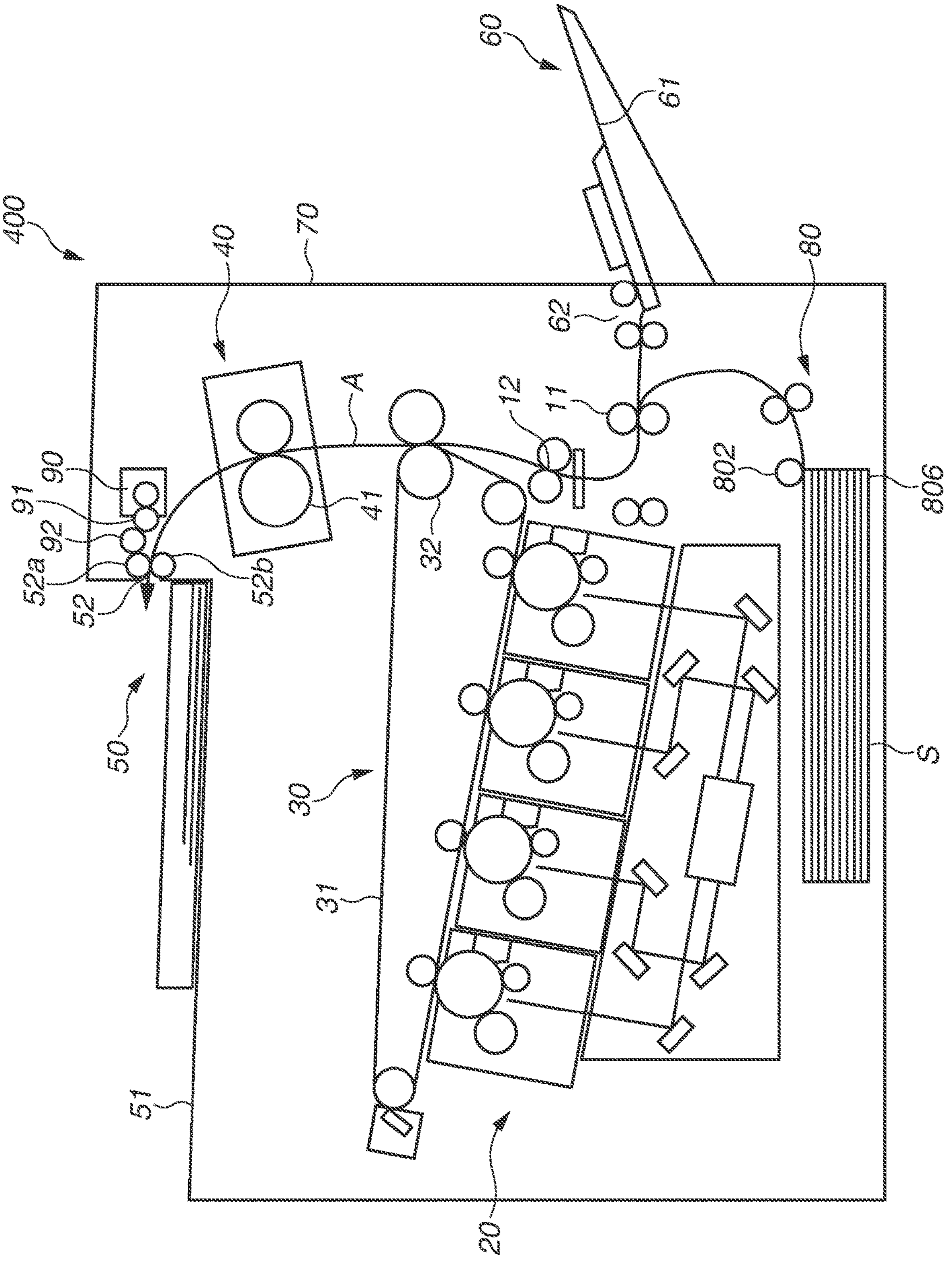
FIG. 1 is a schematic cross-sectional view of an image forming apparatus according to a first exemplary embodiment.

First, an image forming apparatus 400 according to a first exemplary embodiment is described with reference to FIG. 1. FIG. 1 is a cross-sectional view of the image forming apparatus 400 that is a color image forming apparatus of an intermediate transfer system using an electrophotographic process technique.

The image forming apparatus 400 includes a sheet feeding unit 80 that feeds a sheet S from a storage 806, an image forming unit 20 that forms an image, an intermediate transfer unit 30 that transfers the formed image onto the sheet S, a fusing unit 40 that fuses a transferred toner image, a sheet discharge unit 50 that discharges the sheet S on which the image has been fused, to outside of the apparatus, and a cover 70.

An arrow A indicates an example of a conveyance path of the sheet S, which is to be fed from the storage 806 and discharged onto a discharged-sheet stacking table 51 of the sheet discharge unit 50. The sheet S is fed from the storage 806 by a pickup roller 802, and is then conveyed to a registration roller pair 12 through a conveyance roller pair 11. The sheet S forms a loop by the registration roller pair 12 so that a direction of a leading end of the sheet S is corrected.

The sheet S having passed through the registration roller pair 12 is conveyed to a transfer roller pair 32. The sheet S is conveyed by the transfer roller pair 32 while abutting on an intermediate transfer belt 31 on which an image formed by the image forming unit 20 is placed as a toner image. As a result, an unfused toner image is formed on the sheet S. The sheet S on which the unfused toner image is placed is conveyed to the fusing unit 40, and a fusing roller pair 41 performs heating or pressurizing processing to fuse the unfused toner image onto the sheet S. The sheet S on which the toner image has been fused is discharged to the discharged-sheet stacking table 51 by a discharge roller pair 52 positioned on a downstream of the fusing unit 40.

In a case where the sheet S having a non-standard size is used, the sheet S is set on a multipurpose tray 61, is fed from the multipurpose tray 61 to the conveyance roller pair 11 by a multiple feeding roller 62, and is then conveyed to the discharged-sheet stacking table 51 in a manner similar to the case where the sheet S is fed from the storage 806.

Figure 2:
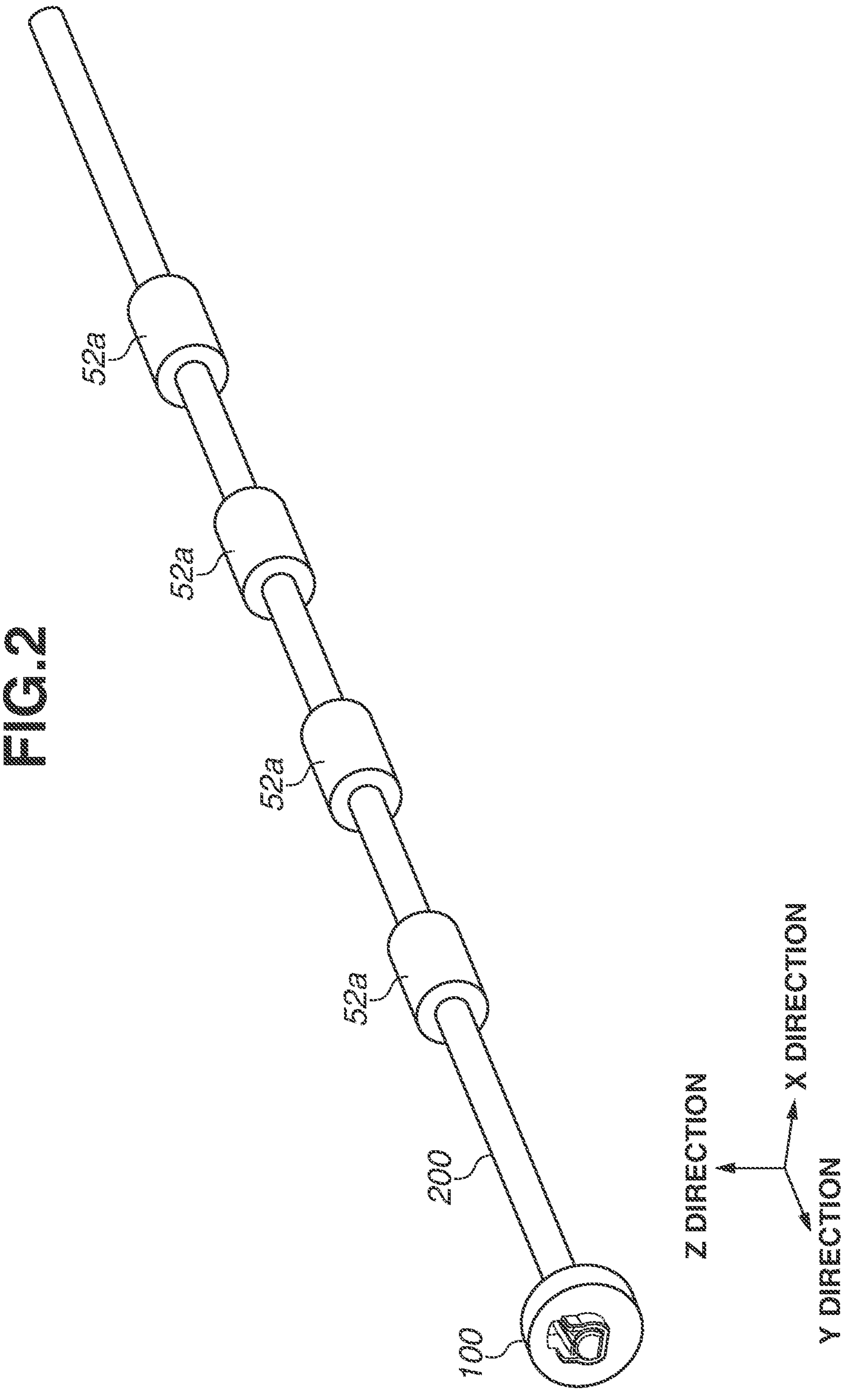
FIG. 2 is a perspective view of a gear and a rotary shaft according to the first exemplary embodiment.

FIG. 2 is a perspective view illustrating a state where a rotary shaft 200 of driving rollers 52*a* is inserted into a gear 100. In the following description, a direction in which the rotary shaft 200 in FIG. 2 extends is referred to as a Y direction, a direction from a rotation center of the gear 100 toward a locking portion 101 described below is referred to as a Z direction, and a direction perpendicular to the Y direction and the Z direction is referred to as an X direction. The Y direction in which the rotary shaft 200 extends is a rotation axis direction of the gear 100. The discharge roller pair 52 illustrated in FIG. 1 includes the driving rollers 52*a* and driven rollers 52*b*. The driving rollers 52*a* as conveyance units obtain a rotational driving force from a motor 90 serving as a driving source through a gear 91 and a gear 92. The driven rollers 52*b* rotate by following the driving rollers 52*a*. As illustrated in FIG. 2, the gear 100 is provided at an end of the rotary shaft 200 of the driving rollers 52*a* to apply the rotational driving force from the motor 90 to the driving rollers 52*a*. The gear 100 attached to the rotary shaft 200 engages with the gear 92 that transmits the rotational driving force from the motor 90 of the image forming apparatus 400, thereby transmitting the driving force from the motor 90 to the rotary shaft 200.

Figure 3:
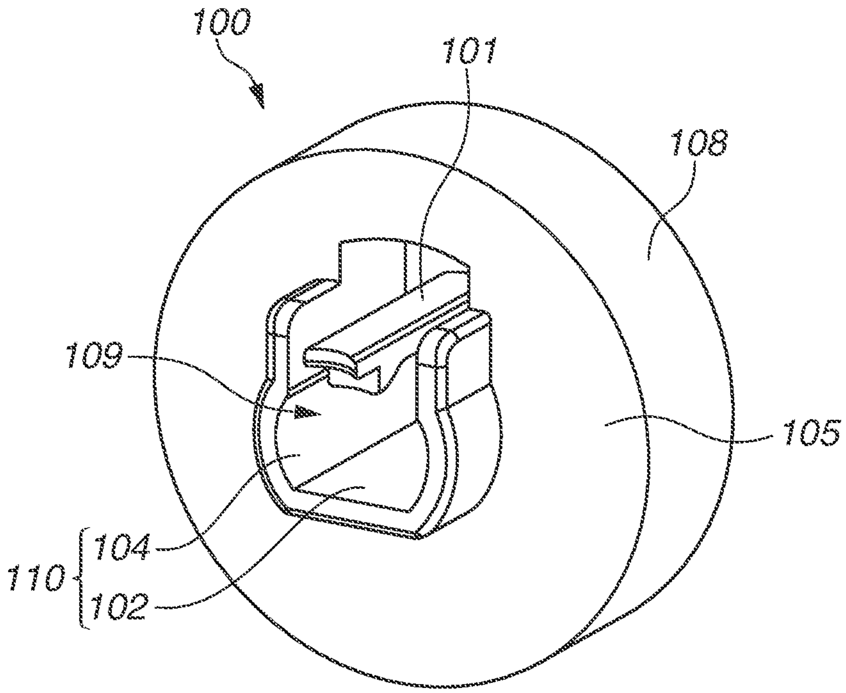
FIG. 3 is a perspective view of the gear according to the first exemplary embodiment.
Figure 4:
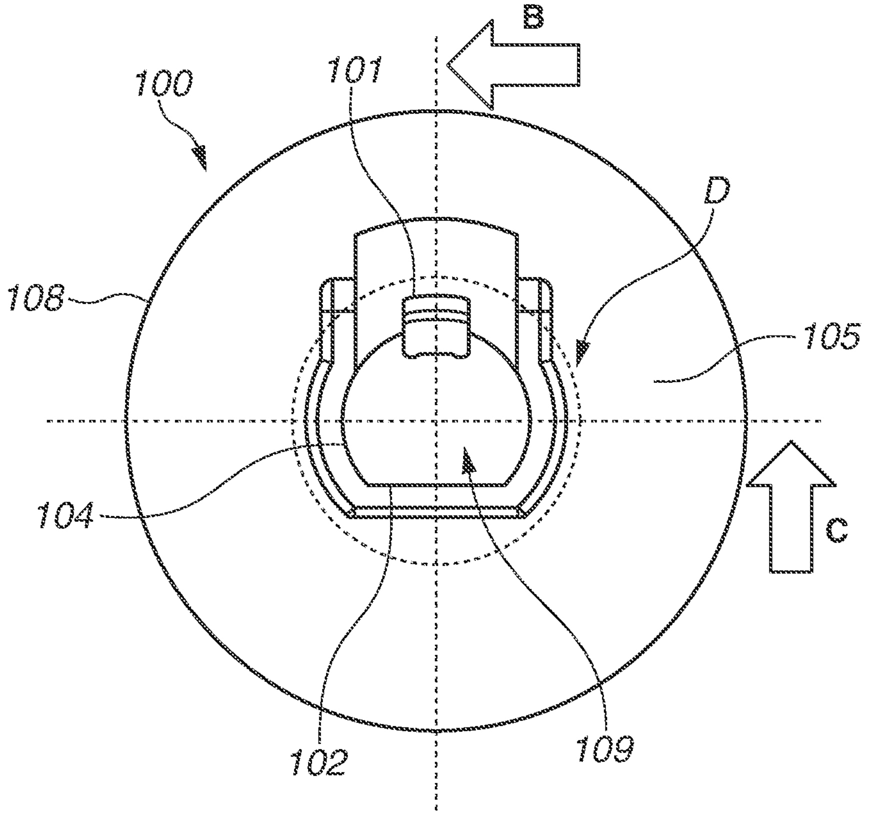
FIG. 4 is a front view of the gear according to the first exemplary embodiment.
Figure 5:
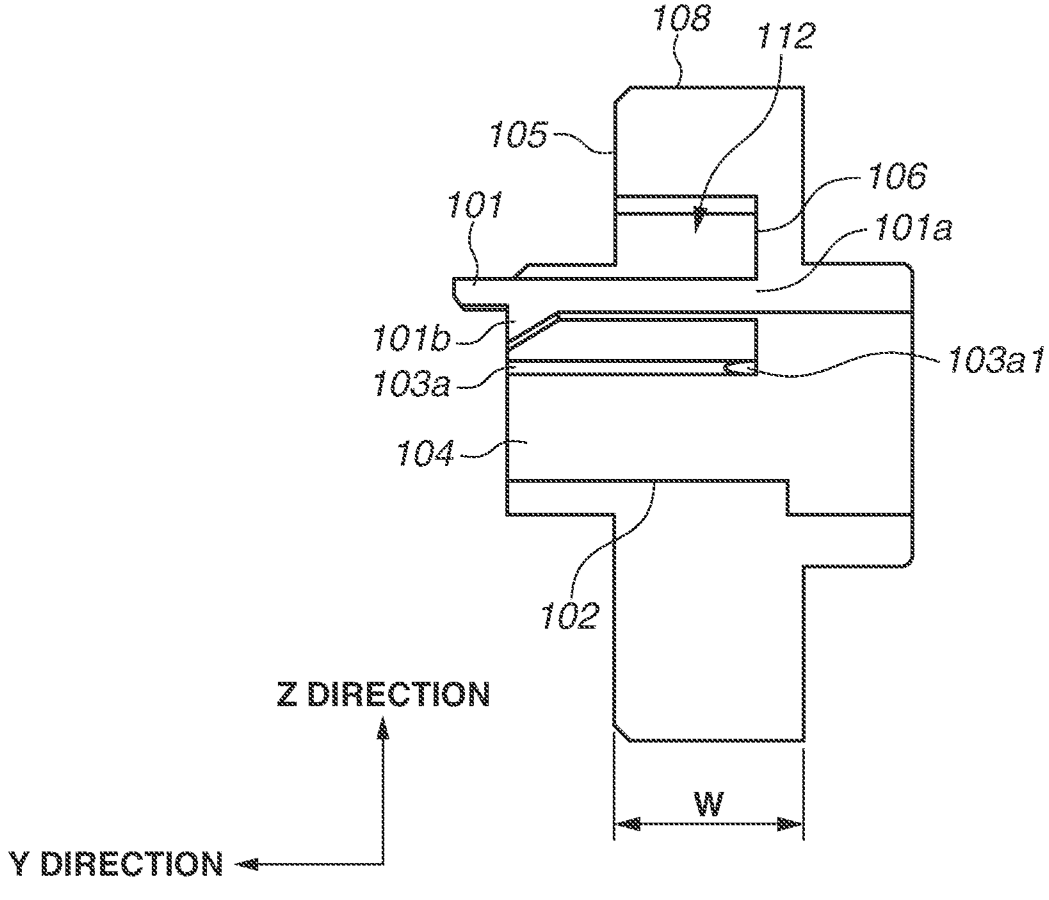
FIG. 5 is a cross-sectional view of the gear according to the first exemplary embodiment.
Figure 6:
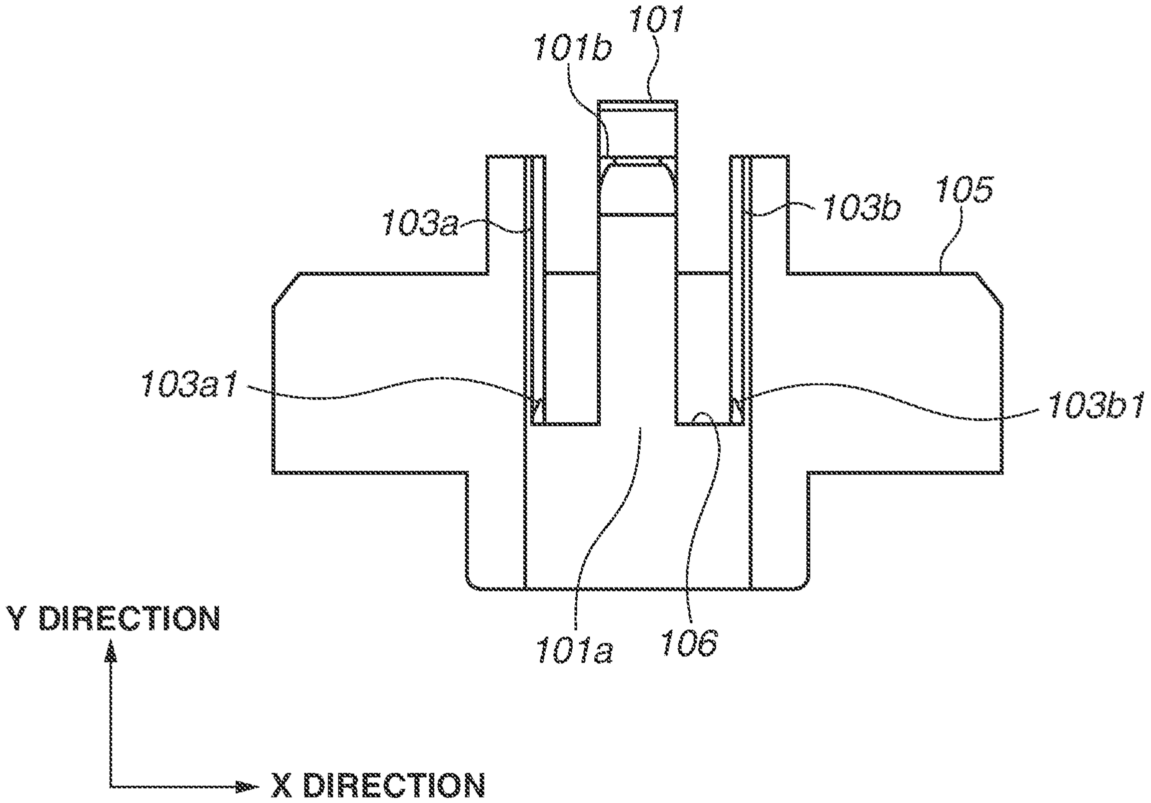
FIG. 6 is a cross-sectional view of the gear according to the first exemplary embodiment.
Figure 7:
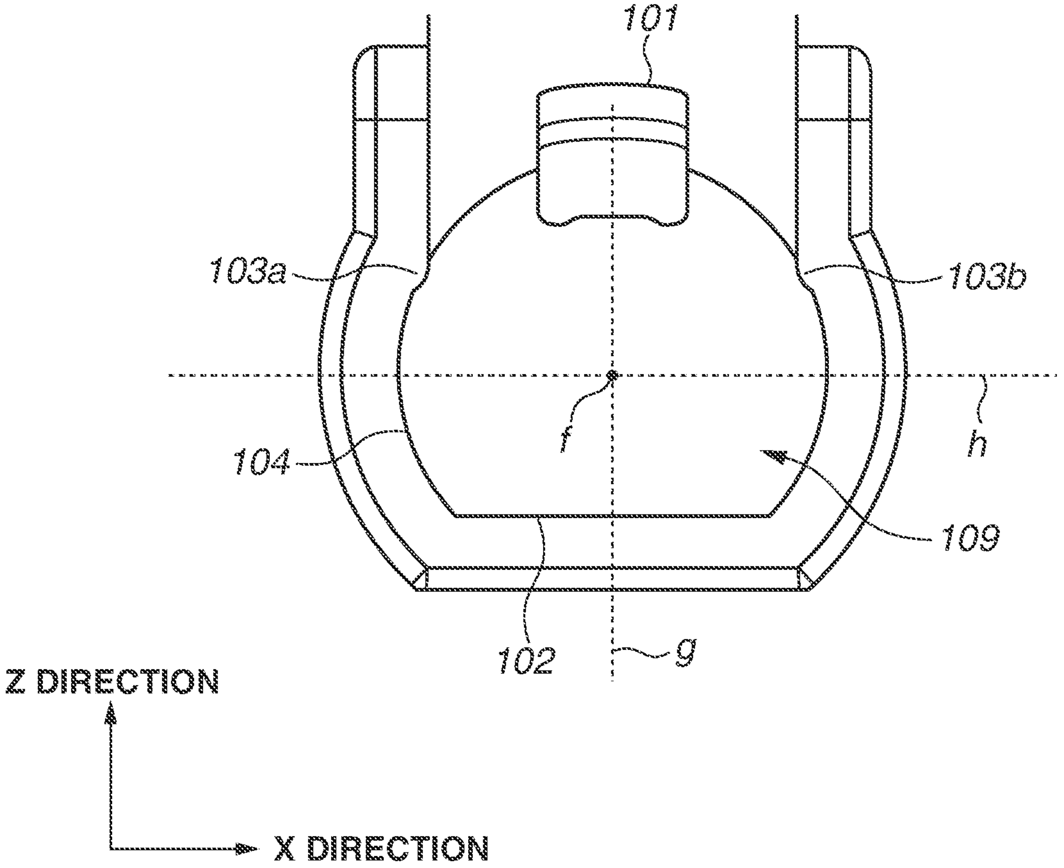
FIG. 7 is an enlarged view of the gear according to the first exemplary embodiment.

A configuration of the gear 100 is described with reference to FIG. 3 to FIG. 7. FIG. 3 is a perspective view of the gear 100, FIG. 4 is a front view of the gear 100, FIG. 5 is a cross-sectional view of the gear 100 as viewed from a direction of an arrow B in FIG. 4, FIG. 6 is a cross-sectional view of the gear 100 as viewed from a direction of an arrow C in FIG. 4, and FIG. 7 is an enlarged view of an area D illustrated by a dashed line in FIG. 4. In the following drawings, illustration of gear teeth of a tooth portion 108 of the gear 100 is omitted.

The gear 100 is made of a resin material such as a polyacetal resin (POM). As illustrated in FIG. 3 and FIG. 4, the gear 100 includes the tooth portion 108 that engages with the gear 92, a wall surface 110 that forms an insertion hole 109 into which the rotary shaft 200 is inserted, the locking portion 101 that is a deformable portion for preventing the gear 100 from falling off from the rotary shaft 200, and a side surface portion 105. The wall surface 110 includes a planar portion 102 (second planar portion) and a cylindrical portion 104 (curved portion). The cylindrical portion 104 is formed to extend in the Z direction from both ends of the planar portion 102 in the X direction. The insertion hole 109 into which the rotary shaft 200 is inserted is formed by the wall surface 110 and the locking portion 101.

An inner side-surface portion 106 illustrated in FIG. 5 is provided at a position recessed by one step from the side surface portion 105, and the locking portion 101 is provided to extend in the Y direction from the inner side-surface portion 106. In other words, the locking portion 101 is provided in an area W provided with the tooth portion 108, in the rotation axis direction (Y direction in FIG. 5) of the gear 100. In the present exemplary embodiment, as illustrated in FIG. 5, a portion extending along the Y direction of the locking portion 101 is partially present in the area W; however, the whole of the locking portion 101 can be present in the area W. The locking portion 101 has a cantilever shape, and includes a craw part 101*b*. The craw part 101*b* serves as an engaging part having a tapered shape on a front end side. When receiving a predetermined force or more in the Z direction, the locking portion 101 is elastically deformed from a locking root part 101*a*. A space 112 for elastic deformation of the locking portion 101 is provided above the locking portion 101 in the Z direction.

As illustrated in FIG. 5 to FIG. 7, the gear 100 includes a first protrusion 103*a* and a second protrusion 103*b* as pressing parts, in the cylindrical portion 104. The first protrusion 103*a* and the second protrusion 103*b* each have a shape protruding from the cylindrical portion 104 toward a cylindrical center (rotation center of gear 100) by about 0.1 mm. Further, a first tapered part 103*a*1 and a second tapered part 103*b*1 are provided at ends on a minus side in the Y direction of the first protrusion 103*a* and the second protrusion 103*b*, respectively. The first tapered part 103*a*1 is an inclined surface increased in height toward a plus side in the Y direction, and smoothly connect a surface of the cylindrical portion 104 and a top of the first protrusion 103*a*. Likewise, the second tapered part 103*b*1 is an inclined surface smoothly connecting the surface of the cylindrical portion 104 and a top of the second protrusion 103*b*.

Figure 8:
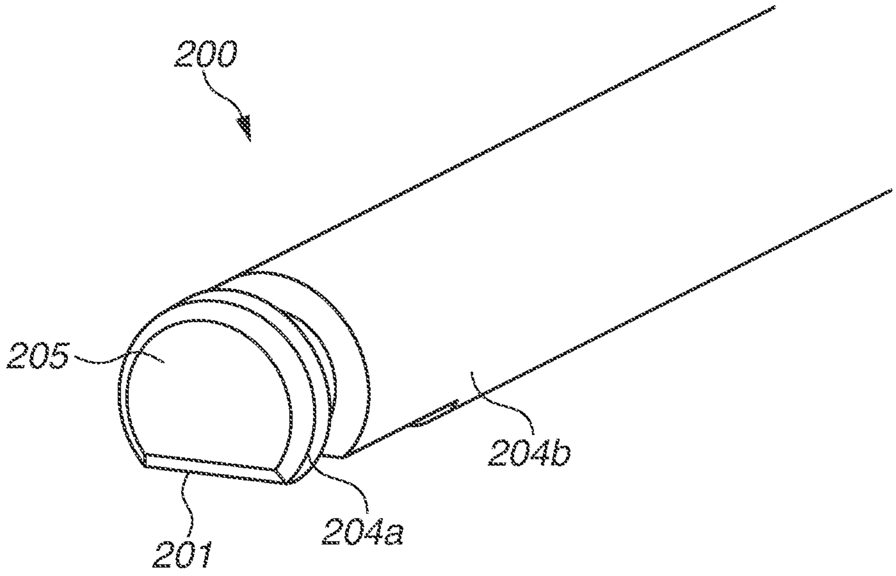
FIG. 8 is a perspective view of the rotary shaft according to the first exemplary embodiment.
Figure 9:
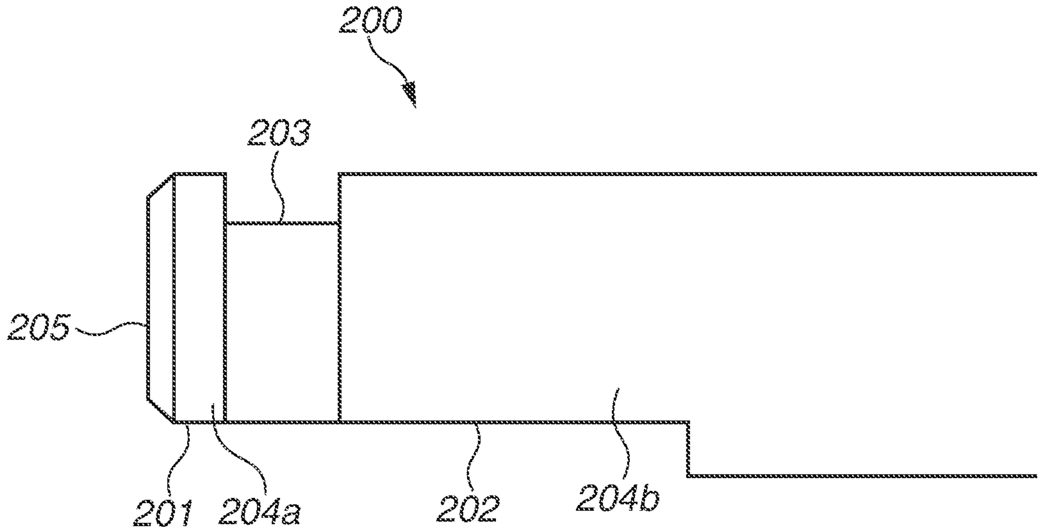
FIG. 9 is a cross-sectional view of the rotary shaft according to the first exemplary embodiment.
Figure 10:
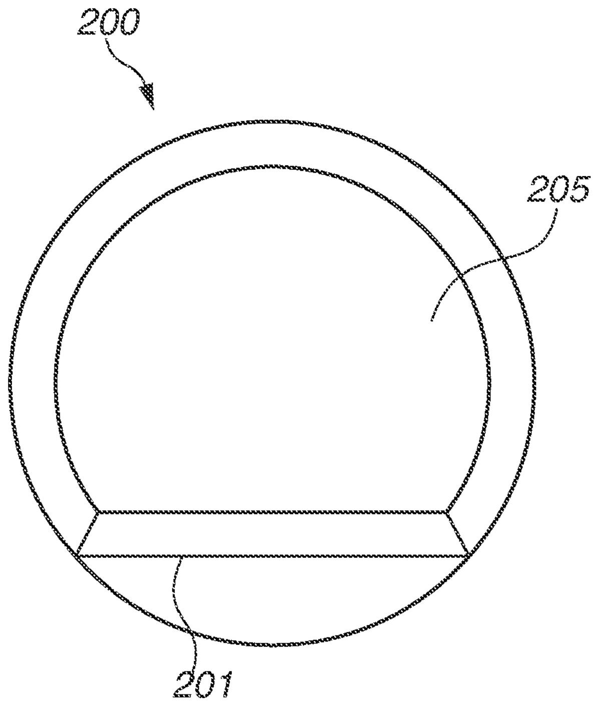
FIG. 10 is a front view of the rotary shaft according to the first exemplary embodiment.

A configuration of the rotary shaft 200 is described with reference to FIG. 8 to FIG. 10. FIG. 8 is a perspective view of the rotary shaft 200, FIG. 9 is a side view of the rotary shaft 200, and FIG. 10 is a front view of the rotary shaft 200.

The rotary shaft 200 is made of an iron material. As illustrated in FIG. 8 to FIG. 10, the rotary shaft 200 includes a first shaft planar portion 201, a second shaft planar portion 202 (first planar portion), a locking craw engaged portion 203, a first shaft cylindrical portion 204*a*, a second shaft cylindrical portion 204*b*, and a shaft side-surface portion 205. The first shaft planar portion 201 and the second shaft planar portion 202 are planar surfaces, and the first shaft cylindrical portion 204*a* and the second shaft cylindrical portion 204*b* are curved surfaces. The locking craw engaged portion 203 as an engaged portion has a concave shape, which is recessed with respect to the first shaft cylindrical portion 204*a* and the second shaft cylindrical portion 204*b*.

Figure 11:
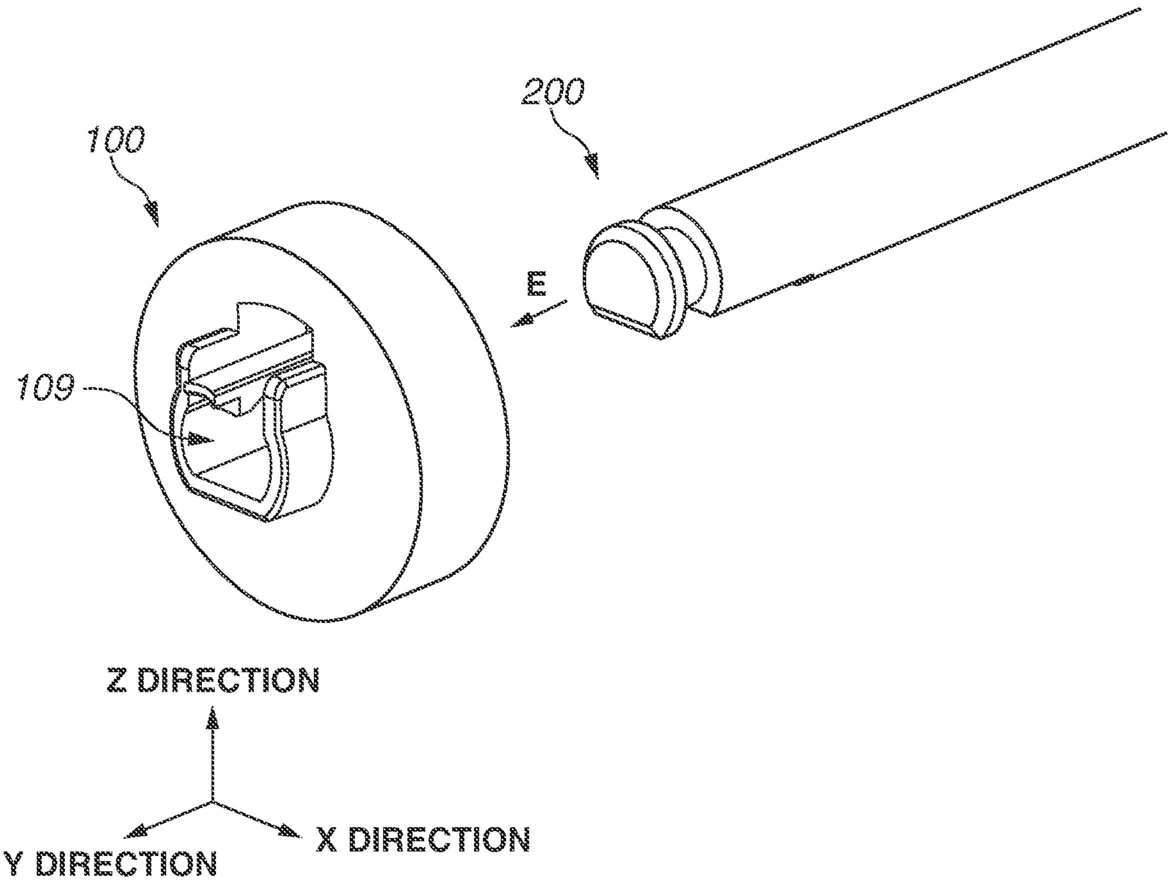
FIG. 11 is a perspective view illustrating a direction in which the rotary shaft is inserted into the gear.
Figure 12:
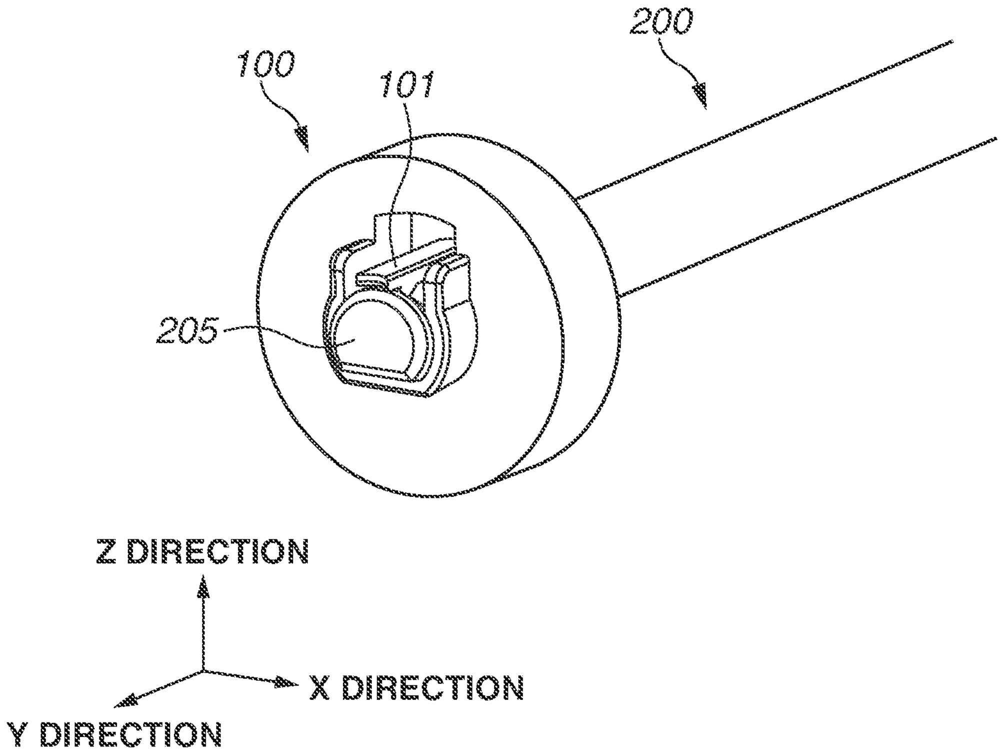
FIG. 12 is a perspective view illustrating a state where the gear is fixed to the rotary shaft.
Figure 13:
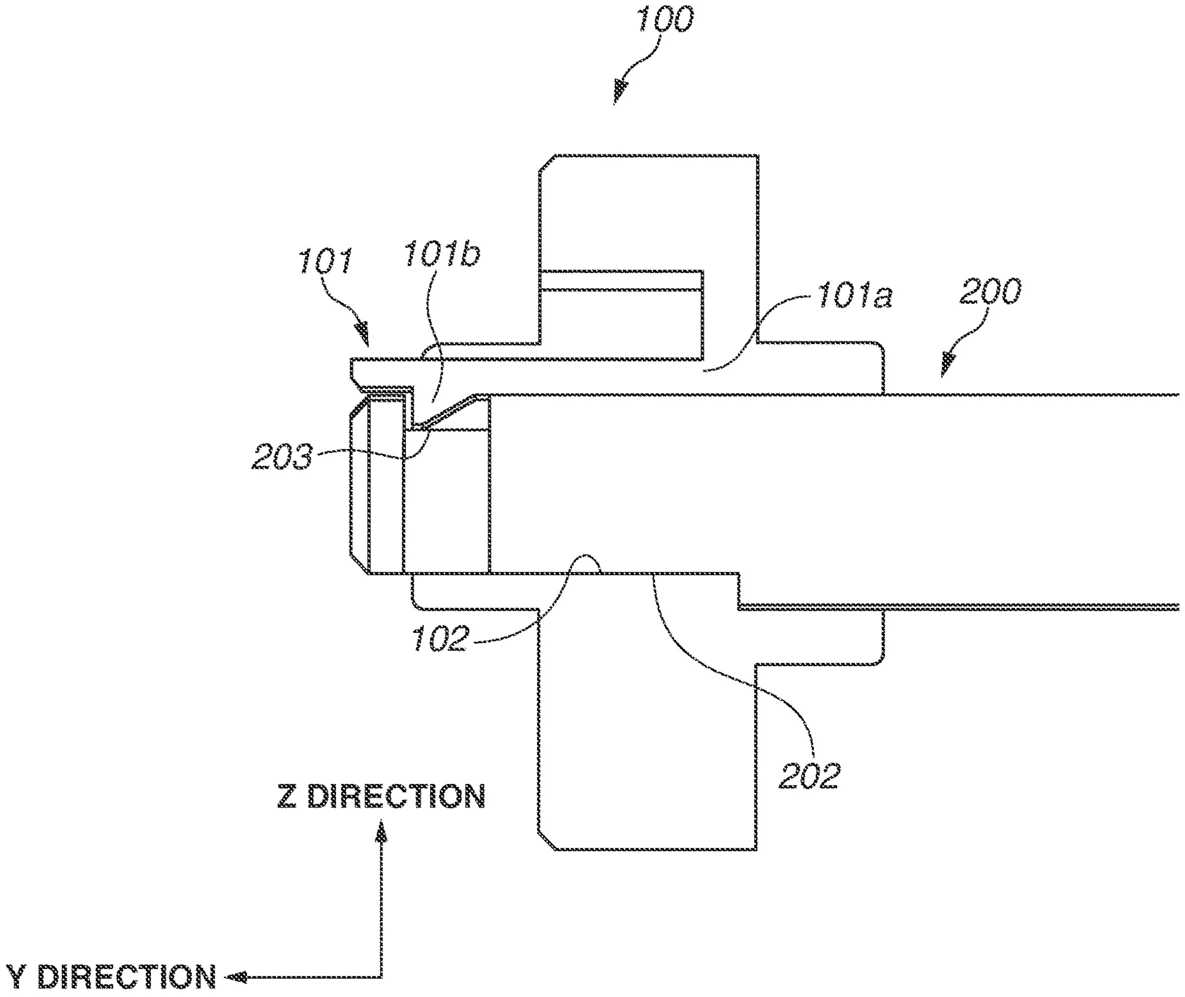
FIG. 13 is a cross-sectional view illustrating the state where the gear is fixed to the rotary shaft.

Motion when the rotary shaft 200 is inserted into the insertion hole 109 of the gear 100 is described. FIG. 11 is a perspective view illustrating a state before the rotary shaft 200 is inserted into the gear 100. FIG. 12 is a perspective view illustrating a fixed state where the gear 100 is fixed to the rotary shaft 200, and FIG. 13 is a cross-sectional view illustrating the fixed state where the gear 100 is fixed to the rotary shaft 200.

When the rotary shaft 200 is inserted into the insertion hole 109 of the gear 100 in a direction of an arrow E (Y direction) from a state illustrated in FIG. 11, the cylindrical portion 104 of the gear 100 is overlapped with the first shaft cylindrical portion 204*a* and the second shaft cylindrical portion 204*b* of the rotary shaft 200. In addition, the planar portion 102 of the gear 100 is overlapped with the first shaft planar portion 201 and the second shaft planar portion 202. When the rotary shaft 200 is further inserted into the insertion hole 109, the shaft side-surface portion 205 comes into contact with the first tapered part 103*a*1 and the second tapered part 103*b*1 that are the inclined surfaces, and then comes into contact with the first protrusion 103*a* and the second protrusion 103*b*. When the rotary shaft 200 is further pushed into the insertion hole 109, the rotary shaft 200 advances while elastically deforming the first protrusion 103*a* and the second protrusion 103*b*, and then the shaft side-surface portion 205 of the rotary shaft 200 comes into contact with the craw part 101*b* of the locking portion 101. Thereafter, the rotary shaft 200 advances while elastically deforming the locking portion 101 from the locking root part 101*a* in the Z direction. The craw part 101*b* finally engages with the locking craw engaged portion 203 to establish the fixed state illustrated in FIG. 12.

In the fixed state illustrated in FIG. 12, the gear 100 is fixed to the rotary shaft 200, and the planar portion 102 of the gear 100 and the second shaft planar portion 202 of the rotary shaft 200 are in contact with each other. In addition, the first protrusion 103*a* and the second protrusion 103*b* are in contact with the second shaft cylindrical portion 204*b* in a state of being elastically deformed.

In the fixed state where the gear 100 is fixed to the rotary shaft 200, the planar portion 102 that is a second regulation portion of the gear 100 and the second shaft planar portion 202 that is a first regulation portion of the rotary shaft 200 are in contact with each other. Accordingly, in a case where the gear 100 rotates around the rotation axis (Y direction), the rotary shaft 200 also rotates in the same direction. As described above, providing the planar portion on each of the gear 100 and the rotary shaft 200 makes it possible to regulate rotation such that the gear 100 and the rotary shaft 200 are only integrally rotatable. In the present exemplary embodiment, the rotation is regulated by providing the planar portion 102 at one position of the gear 100; however, the configuration is not limited thereto. Alternatively, a shape including a plurality of planes, for example, two planes can be used to regulate the rotation.

As described above, when the rotary shaft 200 is inserted into the insertion hole 109 of the gear 100, the rotary shaft 200 is inserted while elastically deforming the first protrusion 103*a* and the second protrusion 103*b* provided on the wall surface 110 forming the insertion hole 109 of the gear 100. Further, the first protrusion 103*a* and the second protrusion 103*b* are in contact with the second shaft cylindrical portion 204*b* in a state of being elastically deformed. Therefore, in the fixed state illustrated in FIG. 13, the rotary shaft 200 is pressed against a side opposite to the locking portion 101 (minus side in Z direction) by an elastic force of the first protrusion 103*a* and the second protrusion 103*b*. In other words, the first protrusion 103*a* and the second protrusion 103*b* press the rotary shaft 200 against the planar portion 102 on the side opposite to the locking portion 101. On the other hand, the cylindrical portion 104 of the gear 100 is urged toward the locking portion 101 (plus side in Z direction) by the elastic force of the first protrusion 103*a* and the second protrusion 103*b*.

Since the locking portion 101 has the cantilever shape and is easily elastically deformed, a retaining force for retaining an attitude of the gear 100 to the rotary shaft 200 is weak. In the present exemplary embodiment, however, the attitude of the gear 100 to the rotary shaft 200 is retained by the elastic force of the first protrusion 103*a* and the second protrusion 103*b*, which makes it possible to prevent the gear 100 from bending the locking portion 101 and being inclined. As a result, it is possible to prevent misalignment between the rotation center of the gear 100 and the axial center of the rotary shaft 200, and to reduce occurrence of eccentricity when the gear 100 rotates.

Further, as described above, when the rotary shaft 200 is inserted into the insertion hole 109 of the gear 100, the shaft side-surface portion 205 comes into contact with the first tapered part 103*a*1 and the second tapered part 103*b*1, and then comes into contact with the first protrusion 103*a* and the second protrusion 103*b*. If the first tapered part 103*a*1 and the second tapered part 103*b*1 that are the inclined surfaces are not provided, the first protrusion 103*a* and the second protrusion 103*b* may be scraped when the shaft side-surface portion 205 comes into contact with the first protrusion 103*a* and the second protrusion 103*b*. In contrast, in the present exemplary embodiment, the shaft side-surface portion 205 first comes into contact with the first tapered part 103*a*1 and the second tapered part 103*b*1 that are the inclined surfaces, whereby making it possible to prevent the first protrusion 103*a* and the second protrusion 103*b* from being scraped.

Positions of the first protrusion 103*a* and the second protrusion 103*b* that are the pressing parts are not limited to the positions described in the present exemplary embodiment. The positions of the first protrusion 103*a* and the second protrusion 103*b* that are the pressing parts are described with reference to FIG. 5 and FIG. 7. In FIG. 7, a straight line connecting a point f that is the rotation center of the gear 100 and a center of the locking portion 101 is defined as a line g (first straight line), and a straight line perpendicular to the line g is defined as a line h (second straight line). The line g is the straight line parallel to the Z direction, and the line h is the straight line parallel to the X direction. In the present exemplary embodiment, the first protrusion 103*a* and the second protrusion 103*b* that are the pressing parts are provided near the locking portion 101 as illustrated in FIG. 7. The positions of the first protrusion 103*a* and the second protrusion 103*b*, however, are not limited thereto, and it is sufficient to provide the first protrusion 103*a* and the second protrusion 103*b* at positions to press the rotary shaft 200, which has been inserted into the insertion hole 109, toward the side opposite to the locking portion 101. In other words, it is sufficient to provide the first protrusion 103*a* and the second protrusion 103*b* on the locking portion 101 side (deformable portion side) relative to the line h illustrated in FIG. 7, in the cylindrical portion 104.

In the present exemplary embodiment, the first protrusion 103*a* and the second protrusion 103*b* are present in a range closer to the craw part 101*b* (plus side in Y direction) than the locking root part 101*a* in the cylindrical portion 104 as illustrated in FIG. 5. However, the first protrusion 103*a* and the second protrusion 103*b* are not necessarily present in the whole of the range closer to the craw part 101*b* than the locking root part 101*a* in the cylindrical portion 104. Further, the first protrusion 103*a* and the second protrusion 103*b* can be present up to a side opposite to the craw part 101*b* (minus side in Y direction) beyond the locking root part 101*a* in the cylindrical portion 104. In other words, it is sufficient for the first protrusion 103*a* and the second protrusion 103*b* to be at least partially present in the range closer to the craw part 101*b* than the locking root part 101*a*. Thus, it is possible to urge the cylindrical portion 104 of the gear 100 toward the locking portion 101 (plus side in Z direction) within a range where the retaining force retaining the attitude of the gear 100 to the rotary shaft 200 is weak.

In the present exemplary embodiment, two convex portions, namely, the first protrusion 103*a* and the second protrusion 103*b* are provided as the pressing parts; however, the pressing part(s) can be provided at one position or three or more positions. Further, the first protrusion 103*a* and the second protrusion 103*b* that are the pressing parts according to the present exemplary embodiment each have a convex shape extending in the Y direction; however, the shape of the pressing parts are not limited thereto. Alternatively, a convex portion can be provided at one position, or a plurality of convex portions can be arranged.

In the present exemplary embodiment, the configurations of the rotary shaft 200 of the driving rollers 52*a* of the discharge roller pair 52 and the gear 100 are described. The configurations of the rotary shaft 200 and the gear 100 can be applied to a driving system of a conveyance unit other than the discharge roller pair 52, such as the pickup roller 802, the conveyance roller pair 11 and the registration roller pair 12. Further, the above-described configurations of the gear 100 and the rotary shaft 200 are applicable to a gear and a rotary shaft thereof not including a conveyance unit, such as the gear 91 and the gear 92. In the present exemplary embodiment, the configuration in which the gear 100 is used for sheet conveyance in the image forming apparatus 400 has been described; however, the gear 100 can be used for sheet conveyance in an image reading apparatus or other apparatuses.

A second exemplary embodiment is described with reference to FIG. 14 to FIG. 18. In the above-described first exemplary embodiment, the configuration, in which the planar portion 102 as the second regulation portion of the gear 100 and the second shaft planar portion 202 as the first regulation portion of the rotary shaft 200 regulate rotation of the gear 100 and the rotary shaft 200 around the Y direction, has been illustrated. In contrast, in the second exemplary embodiment, a configuration using a pin 300 to regulate rotation of the gear 100 and the rotary shaft 200 around the Y axis is described. A gear 100*a* and a rotary shaft 200*a* described in the second exemplary embodiment are used to transmit the rotational driving force from the motor 90 to the driving rollers 52*a* for conveying a sheet in the image forming apparatus 400, as with the gear 100 and the rotary shaft 200 described in the first exemplary embodiment. In the second exemplary embodiment, configurations other than the gear 100*a* and the rotary shaft 200*a* of the image forming apparatus 400 are similar to those of the first exemplary embodiment, so that descriptions thereof are omitted.

Figure 14:
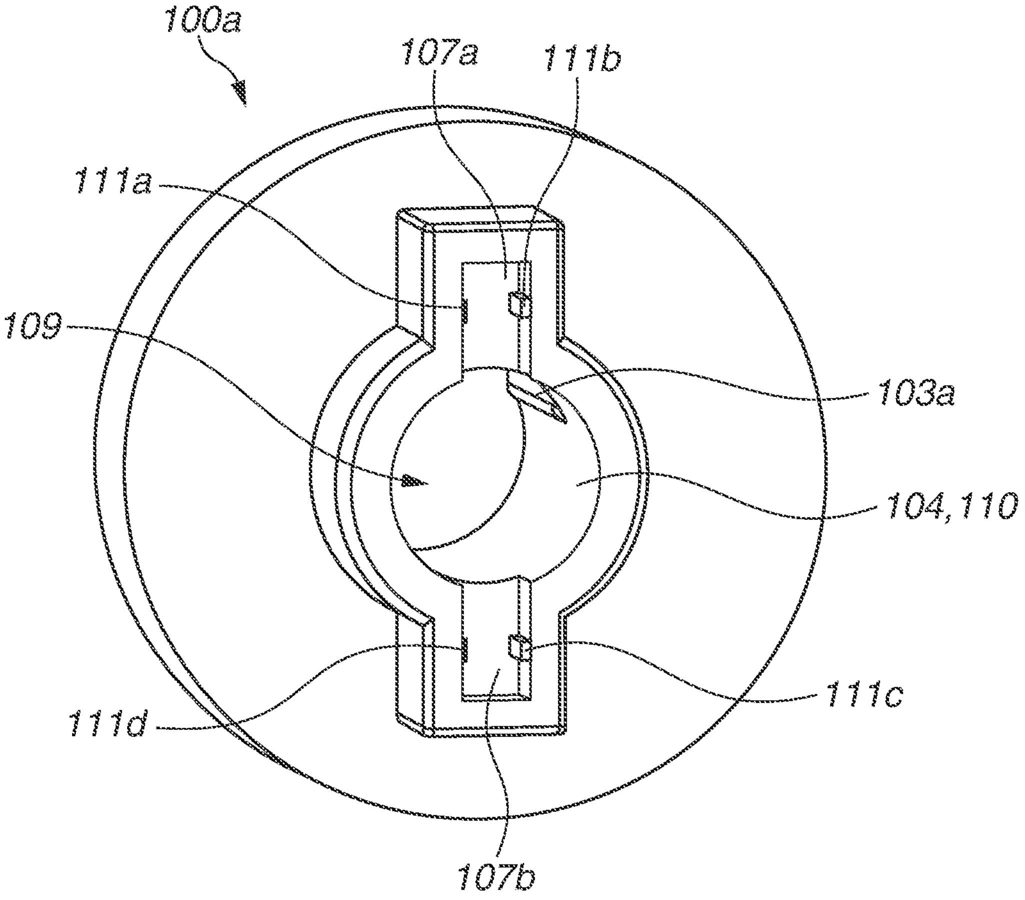
FIG. 14 is a perspective view illustrating a gear according to a second exemplary embodiment.
Figure 15:
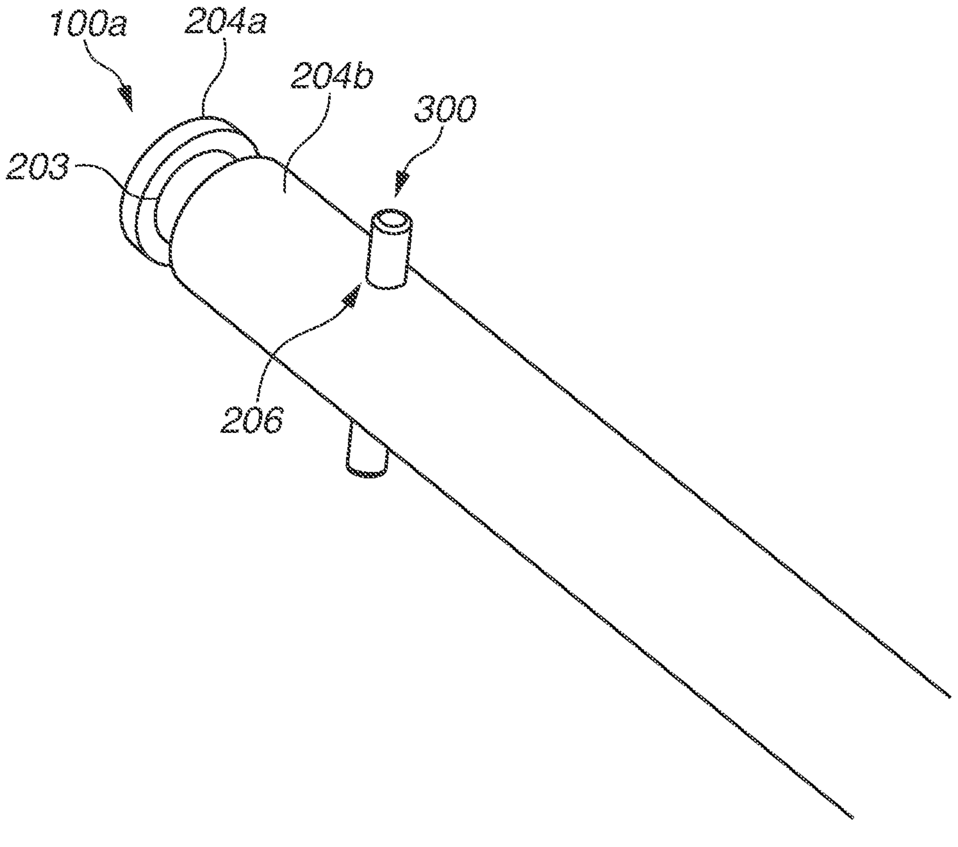
FIG. 15 is a perspective view illustrating a rotary shaft according to the second exemplary embodiment.
Figure 18:
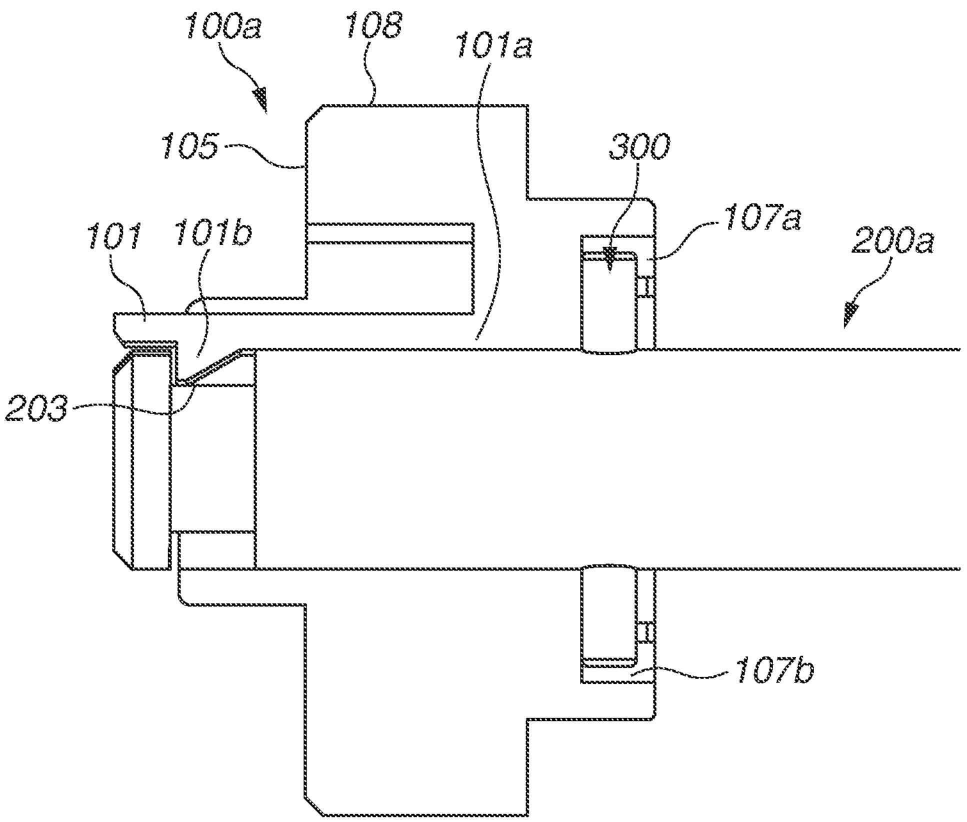
FIG. 18 is a cross-sectional view illustrating the state where the gear is fixed to the rotary shaft.

FIG. 14 is a perspective view of the gear 100*a*, and FIG. 15 is a perspective view of the rotary shaft 200*a*. FIG. 18 is a cross-sectional view illustrating a fixed state where the gear 100*a* is fixed to the rotary shaft 200*a*. As illustrated in FIG. 18, the gear 100*a* includes the tooth portion 108, the locking portion 101, and the side surface portion 105, as with the above-described gear 100. Further, as illustrated in FIG. 14, the wall surface 110 forming the insertion hole 109 of the gear 100*a* includes only the cylindrical portion 104, and the first protrusion 103*a* and the second protrusion 103*b* similar to the gear 100 described in the first exemplary embodiment are provided in the cylindrical portion 104. The gear 100*a* includes a first pin fitting portion 107*a* and a second pin fitting portion 107*b* as the second regulation portions, and a first press-in part 111*a*, a second press-in part 111*b*, a third press-in part 111*c*, and a fourth press-in part 111*d* are provided inside the first pin fitting portion 107*a* and the second pin fitting portion 107*b*.

As with the above-described rotary shaft 200, the rotary shaft 200*a* illustrated in FIG. 15 includes the locking craw engaged portion 203, the first shaft cylindrical portion 204*a*, and the second shaft cylindrical portion 204*b*. The rotary shaft 200*a* further includes a pin insertion hole 206 into which the pin 300 is inserted, and the pin 300 as the first regulation portion is inserted into the pin insertion hole 206.

Figure 16:
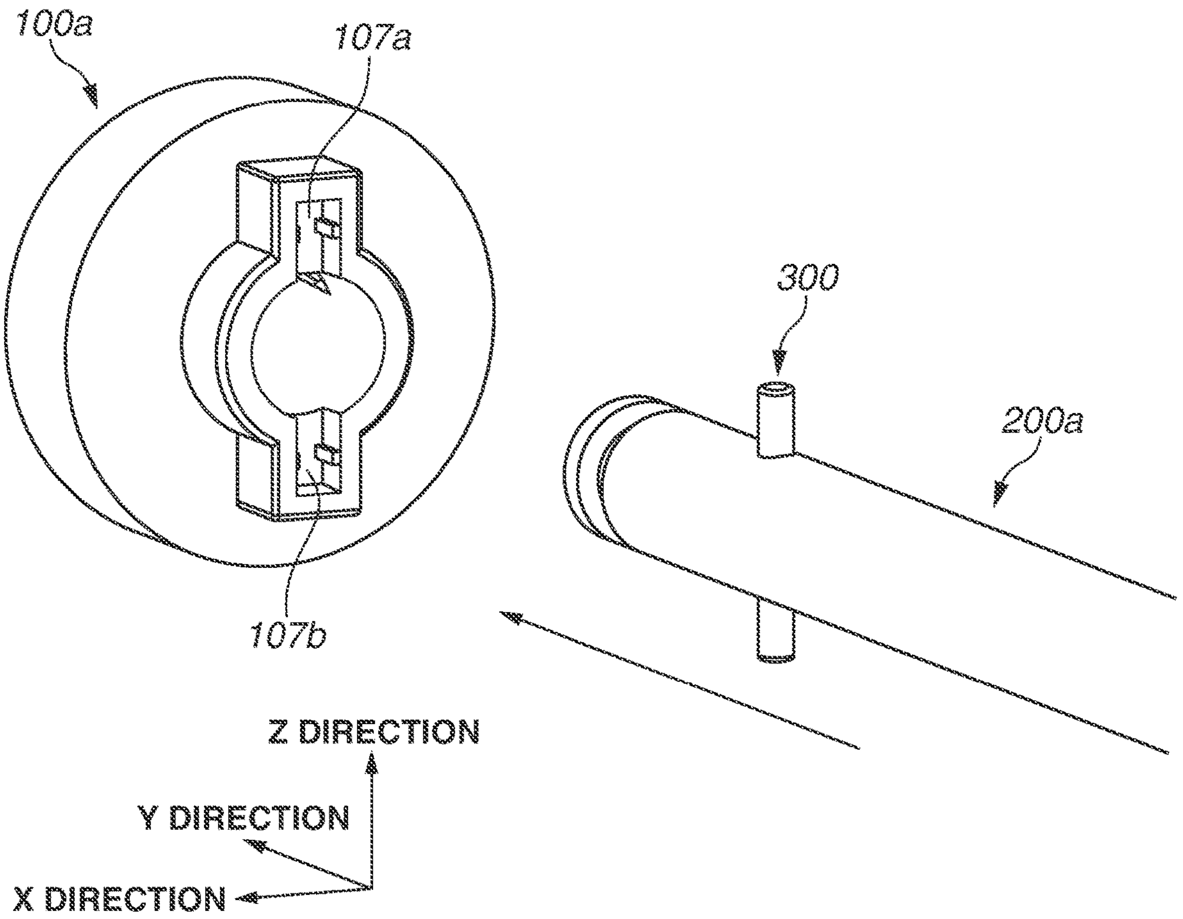
FIG. 16 is a perspective view illustrating a direction in which the rotary shaft is inserted into the gear.
Figure 17:
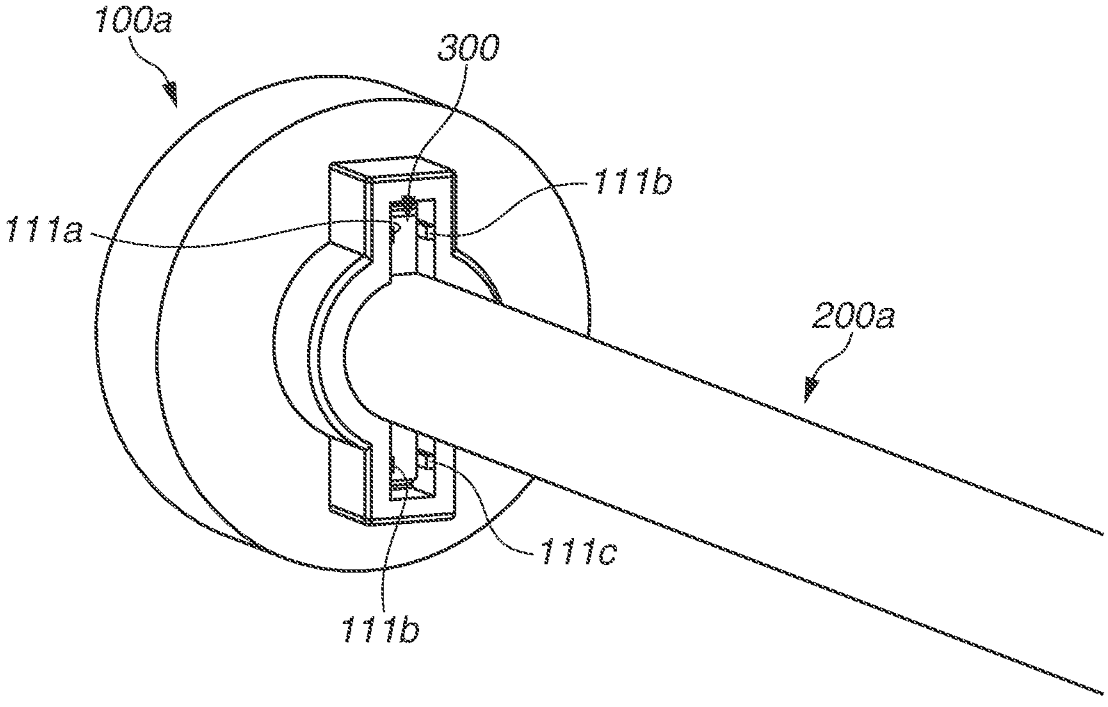
FIG. 17 is a perspective view illustrating a state where the gear is fixed to the rotary shaft.

FIG. 16 is a perspective view illustrating a state before the rotary shaft 200*a* is inserted into the gear 100*a*, and FIG. 17 is a perspective view illustrating a state where the gear 100*a* is fixed to the rotary shaft 200*a*. As illustrated in FIG. 16, the rotary shaft 200*a* is inserted into the gear 100*a* in the Y direction. At this time, the rotary shaft 200*a* is inserted while elastically deforming the first protrusion 103*a* and the second protrusion 103*b* of the gear 100*a*. Further, the rotary shaft 200*a* advances while elastically deforming the locking portion 101 from the locking root part 101*a* in the Z direction. The craw part 101*b* finally engages with the locking craw engaged portion 203 to establish the fixed state illustrated in FIG. 17 and FIG. 18.

In the fixed state illustrated in FIG. 17 and FIG. 18, the first protrusion 103*a* and the second protrusion 103*b* are in contact with the second shaft cylindrical portion 204*b* in a state of being elastically deformed. As in the first exemplary embodiment, the cylindrical portion 104 of the gear 100*a* is urged toward the locking portion 101 (plus side in Z direction) by the elastic force of the first protrusion 103*a* and the second protrusion 103*b*, thereby preventing the gear 100*a* from bending the locking portion 101 and being inclined. As a result, occurrence of eccentricity of the gear 100*a* is suppressed.

Further, when the rotary shaft 200*a* is inserted into the gear 100*a*, the pin 300 fits into the first pin fitting portion

107*a* and the second pin fitting portion 107*b*. An internal distance between the first press-in part 111*a* and the second press-in part 111*b* provided in the first pin fitting portion 107*a* is made smaller than a width of the pin 300, and the pin 300 is fixed in a state where the first press-in part 111*a* and the second press-in part 111*b* are elastically deformed. The second pin fitting portion 107*b* also has a configuration similar to the configuration of the first pin fitting portion 107*a*. As a result, it is possible to prevent delay caused by backlash when the gear 100*a* and the rotary shaft 200*a* integrally rotate.

As illustrated in FIG. 17 and FIG. 18, when the gear 100*a* rotates around the Y direction in the state where the gear 100*a* is fixed to the rotary shaft 200*a*, the rotary shaft 200*a* also rotates in the same direction by the pin 300. As described above, the rotation can be regulated using the pin 300 such that the gear 100*a* and the rotary shaft 200*a* are only integrally rotatable.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-143827, filed Aug. 27, 2020, which is hereby incorporated by reference herein in its entirety.

What is claimed is:

1. A sheet conveyance device comprising:

a rotary shaft configured to include an engaged portion having a concave-shape;

a conveyance roller configured to rotate around the rotary shaft and to convey a sheet;

a driving source configured to drive the conveyance roller; and a gear configured to rotate integrally with the rotary shaft and to transmit a driving force from the driving source to the conveyance roller, wherein the gear includes:

a tooth portion configured to engage with another gear, a wall surface configured to form an insertion hole into which the rotary shaft is inserted, a deformable portion configured to have a cantilever shape at least partially provided in an area provided with the tooth portion in a rotation axis direction of the gear, configured to form the insertion hole together with the wall surface, and configured to be elastically deformed by being pressed by the rotary shaft when the rotary shaft is inserted into the insertion hole, an engaging part configured to protrude from the deformable portion toward a rotation center of the gear, to engage with the engaged portion of the rotary shaft when the rotary shaft is inserted while elastically deforming the deformable portion, and to prevent the rotary shaft from falling off from the insertion hole, and a pressing part configured to protrude from the wall surface toward the rotation center of the gear, configured to be elastically deformed by being pressed by the rotary shaft when the rotary shaft is inserted into the insertion hole, and configured to press the rotary shaft toward the wall surface on a side opposite to the deformable portion in a state where the gear is attached to the rotary shaft.

2. The sheet conveyance device according to claim 1, wherein the pressing part is a protrusion extending along the rotation axis direction.

3. The sheet conveyance device according to claim 1, wherein the pressing part includes two protrusions provided on the wall surface.

4. The sheet conveyance device according to claim 1, wherein, in a case where a straight line, passing through the rotation center of the gear and a center of the deformable portion, is defined as a first straight line and a straight line, passing through the gear rotation center and perpendicular to the first straight line, is defined as a second straight line, the pressing part is provided on the wall surface on a side close to the deformable portion relative to the second straight line.

5. The sheet conveyance device according to claim 1, wherein the pressing part has an inclined surface, which is inclined to the rotation axis direction at an end portion of the pressing part in the rotation axis direction.

6. The sheet conveyance device according to claim 1, wherein the rotary shaft includes a first planar portion, wherein the wall surface includes a curved portion and a second planar portion, and wherein, when the first planar portion and the second planar portion abut on each other in the state where the gear is attached to the rotary shaft, the rotary shaft and the gear integrally rotate.

7. The sheet conveyance device according to claim 6, wherein the pressing part protrudes from the curved portion, and presses the rotary shaft toward the second planar portion in the state where the gear is attached to the rotary shaft.

8. The sheet conveyance device according to claim 1, wherein the rotary shaft includes a pin extending in a direction perpendicular to the rotation axis direction, wherein the gear includes a fitting portion into which the pin fits, and wherein, when the pin fits into the fitting portion in the state where the gear is attached to the rotary shaft, the rotary axis and the gear integrally rotate.

9. An image forming apparatus, comprising:

a rotary shaft configured to include an engaged portion having a concave-shape;

a conveyance roller configured to rotate around the rotary shaft and to convey a sheet;

a driving source configured to drive the conveyance roller;

a gear configured to rotate integrally with the rotary shaft and to transmit a driving force from the driving source to the conveyance roller; and an image forming unit configured to form an image on the sheet conveyed by the conveyance roller, wherein the gear includes:

a tooth portion configured to engage with another gear, a wall surface configured to form an insertion hole into which the rotary shaft is inserted, a deformable portion configured to have a cantilever shape at least partially provided in an area provided with the tooth portion in a rotation axis direction of the gear, configured to form the insertion hole together with the wall surface, and configured to be elastically deformed by being pressed by the rotary shaft when the rotary shaft is inserted into the insertion hole, an engaging part configured to protrude from the deformable portion toward a rotation center of the gear, to engage with the engaged portion of the rotary shaft when the rotary shaft is inserted while elastically deforming the deformable portion, and to prevent the rotary shaft from falling off from the insertion hole, and a pressing part configured to protrude from the wall surface toward the rotation center of the gear, configured to be elastically deformed by being pressed by the rotary shaft when the rotary shaft is inserted into the insertion hole, and configured to press the rotary shaft toward the wall surface on a side opposite to the deformable portion in a state where the gear is attached to the rotary shaft.

10. A gear configured to be attached to a rotary shaft configured to include an engaged portion having a concave-shape, configured to rotate integrally with the rotary shaft, and configured to transmit a driving force from a driving source to a conveyance roller configured to convey a sheet, the gear comprising:

a tooth portion configured to engage with another gear, a wall surface configured to form an insertion hole into which the rotary shaft is inserted, a deformable portion configured to have a cantilever shape at least partially provided in an area provided with the tooth portion in a rotation axis direction of the gear, configured to form the insertion hole together with the wall surface, and configured to be elastically deformed by being pressed by the rotary shaft when the rotary shaft is inserted into the insertion hole, an engaging part configured to protrude from the deformable portion toward a rotation center of the gear, to engage with the engaged portion of the rotary shaft when the rotary shaft is inserted while elastically deforming the deformable portion, and to prevent the rotary shaft from falling off from the insertion hole, and a pressing part configured to protrude from the wall surface toward the rotation center of the gear, configured to be elastically deformed by being pressed by the rotary shaft when the rotary shaft is inserted into the insertion hole, and configured to press the rotary shaft toward the wall surface on a side opposite to the deformable portion in a state where the gear is attached to the rotary shaft.

11. The gear according to claim 10, wherein the pressing part is a protrusion extending along the rotation axis direction.

12. The gear according to claim 10, wherein the pressing part includes two protrusions provided on the wall surface.

13. The gear according to claim 10, wherein, in a case where a straight line, passing through the rotation center of the gear and a center of the deformable portion, is defined as a first straight line and a straight line, passing through the gear rotation center and perpendicular to the first straight line, is defined as a second straight line, the pressing part is provided on the wall surface on a side close to the deformable portion relative to the second straight line.

14. The gear according to claim 10, wherein the pressing part has an inclined surface, which is inclined to the rotation axis direction at an end portion of the pressing part in the rotation axis direction.

15. The gear according to claim 10, wherein the wall surface includes a curved portion and a planar portion, and wherein the pressing part protrudes from the curved portion, and presses the rotary shaft toward the planar portion in the state where the gear is attached to the rotary shaft.

16. The gear according to claim 10, further comprising a fitting portion into which a pin fits, wherein the pin is provided to the rotary shaft and extending in a direction perpendicular to the rotation axis direction.

* * * * *